(12) United States Patent
Kyakuno et al.

(10) Patent No.: US 11,121,854 B2
(45) Date of Patent: Sep. 14, 2021

(54) IMAGING MODULE, IMAGE PROCESSING DEVICE, AND IMAGE PROCESSING METHOD

(71) Applicant: AXELL CORPORATION, Tokyo (JP)

(72) Inventors: Kazuki Kyakuno, Tokyo (JP); Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 209 days.

(21) Appl. No.: 16/229,278

(22) Filed: Dec. 21, 2018

(65) Prior Publication Data

US 2019/0199511 A1    Jun. 27, 2019

(30) Foreign Application Priority Data

Dec. 22, 2017    (JP) .................................. 2017-246082

(51) Int. Cl.
| | | |
|---|---|---|
| *H04L 9/32* | (2006.01) | |
| *H04L 9/30* | (2006.01) | |
| *G06N 3/04* | (2006.01) | |
| *H04L 9/00* | (2006.01) | |
| *G06N 3/08* | (2006.01) | |
| *H04L 9/14* | (2006.01) | |

(52) U.S. Cl.
CPC ............... *H04L 9/008* (2013.01); *G06N 3/08* (2013.01); *H04L 9/14* (2013.01); *H04L 9/3093* (2013.01); *H04L 9/3297* (2013.01)

(58) Field of Classification Search
CPC ..... H04L 9/008; H04L 9/3297; H04L 9/3093; H04L 9/14; G06N 3/08; G06N 3/04
See application file for complete search history.

(56) References Cited

U.S. PATENT DOCUMENTS

| 6,400,824 B1 * | 6/2002 | Mansoorian ....... H04N 21/2187 380/269 |
| 2007/0201693 A1 | 8/2007 | Ohno |
| 2011/0026781 A1 * | 2/2011 | Osadchy ............ G06K 9/00221 382/118 |
| 2012/0054485 A1 * | 3/2012 | Tanaka ..................... H04N 7/18 713/150 |
| 2015/0280914 A1 | 10/2015 | Yasuda et al. |
| 2016/0292512 A1 | 10/2016 | Kanna et al. |

(Continued)

FOREIGN PATENT DOCUMENTS

| JP | 2007-199807 | 8/2007 |
| JP | 2007-235324 | 9/2007 |
| JP | 2012-49679 | 3/2012 |

(Continued)

OTHER PUBLICATIONS

Office Action dated Mar. 17, 2020 in corresponding Japanese Patent Application No. 2017-246082; with English Translation.

(Continued)

*Primary Examiner* — Vu V Tran
(74) *Attorney, Agent, or Firm* — Wenderoth, Lind & Ponack, L.L.P.

(57) ABSTRACT

An aspect of the invention is directed to an imaging module including: an imaging device which converts an input optical image into image data; an encryption device which encrypts the image data by a homomorphic encryption method; and an interface which outputs encrypted image data received from the encryption device.

18 Claims, 11 Drawing Sheets

(56) References Cited

U.S. PATENT DOCUMENTS

2016/0350648 A1 12/2016 Gilad-Bachrach et al.
2018/0183588 A1* 6/2018 Corcoran ................ G06F 21/32

FOREIGN PATENT DOCUMENTS

| JP | 2015-184594 | 10/2015 |
| JP | 2016-191973 | 11/2016 |

OTHER PUBLICATIONS

Hesamifard, E. et al., "CryptoDL: Deep Neural Networks over Encrypted Data", arXiv [online], Nov. 2017, 1711.05189, pp. 1-21.

* cited by examiner

IMAGING MODULE, IMAGE PROCESSING DEVICE, AND IMAGE PROCESSING METHOD

CROSS-REFERENCE TO RELATED APPLICATIONS

This application claims the benefit of Japanese Patent Application JP 2017-246082, filed Dec. 22, 2017, the entire content of which is hereby incorporated by reference, the same as if set forth at length.

FIELD OF THE INVENTION

The embodiments discussed herein are related to a technique for dealing with encrypted image data.

BACKGROUND OF THE INVENTION

Applying neural network-based image recognition processing to home automation and home security is now being studied. Examples of the application of neural network-based image recognition processing are automatic activation of a home air-conditioner (home automation) and detection of intrusion of a thief into a house (home security).

In such applications, a server for processing image data using a neural network is installed in a data center and a home apparatus incorporating a camera is installed in a user home. The home apparatus transmits image data taken by the camera to the server over a communication network such as the Internet. The server performs neural network-based image recognition processing and returns a processing result to the home apparatus over the communication network.

JP-A-2007-199807 discloses a technique for judging whether a detection target event corresponding to a crime using detection results of a sensor group including plural sensors (including a camera) and a neural network.

JP-A-2015-184594 discloses that a ciphertext processing server performs matching on two text data (converted into numeric vectors) whose secrecy is ensured by homomorphic encryption. A collator terminal receives a collation result ciphertext from the ciphertext processing server and decrypts the collation result. JP-A-2015-184594 also discloses a technique for generating private keys for respective users.

SUMMARY OF THE INVENTION

Transmitting image data taken in a home to a server over a communication network has privacy risk such as a leak of images. One countermeasure is to perform image recognition processing in a home apparatus. An additional measure is to mount an imaging device and an image recognition device on the same board of the home apparatus and perform, within the same board, image recognition processing on image data taken by the imaging device. These measures make it unnecessary to transmit image data taken by the imaging device from the home apparatus to an external server.

However, usually, image recognition devices incorporate a processor and a RAM (random access memory) and the processor performs image recognition processing on image data developed in the RAM according to certain software. Image data taken by the imaging device are stored in the RAM. Thus, there exists risk that a malignant person enters the image recognition device illegally and causes image data to leak out from the RAM.

An object of the invention is to provide a technique capable of preventing a leak of images.

An imaging module according to one aspect of the embodiments comprises an imaging device which converts an input optical image into image data; an encryption device which encrypts the image data by a homomorphic encryption method; and an interface which outputs encrypted image data received from the encryption device.

According to the one aspect of the embodiments, since the imaging device and the encryption device are integrated into the imaging module, it is difficult to take out image data of plaintext (plaintext image data) to outside the imaging module, whereby a leak of images can be prevented.

DETAILED DESCRIPTION OF THE INVENTION

Embodiments of the present invention will be hereinafter described with reference to the drawings. The embodiments are just examples for description of the invention and it is not intended to restrict the scope of the invention to the embodiments. Those skilled in the art could practice the invention in various other forms without departing from the spirit and scope of the invention.

Embodiment 1

Figure 1:
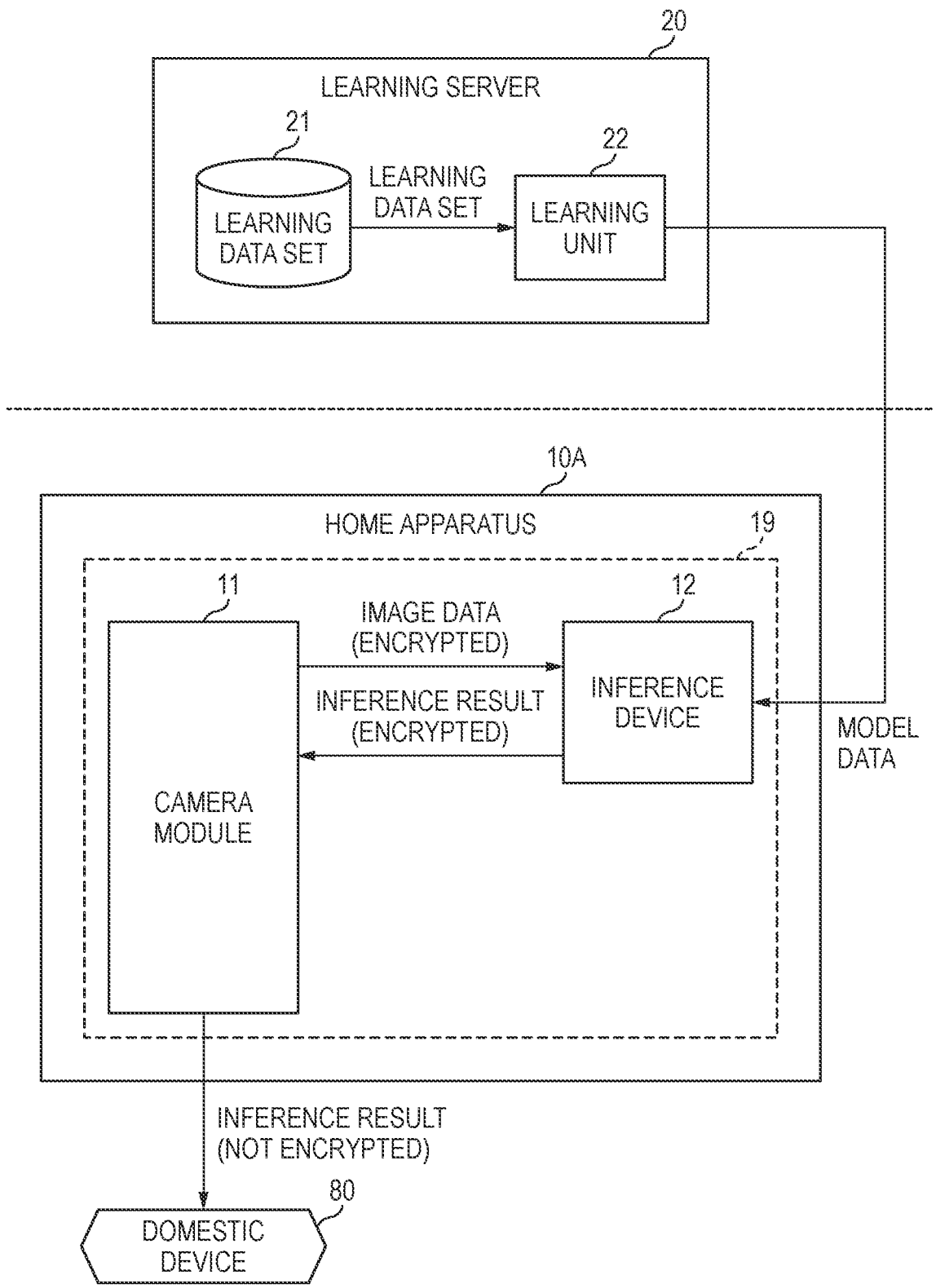
FIG. 1 is a block diagram of a home security system according to a first embodiment.

FIG. 1 is a block diagram of a home security system according to a first embodiment. The home security system according to this embodiment is a system for realizing home security that, for example, intrusion of a suspicious person from room images, whereupon a lamp is lit, an alarm sound is generated, and reporting and other necessary actions are made. This home security system includes a home apparatus 10A, a learning server 20, and a domestic device 80. The home apparatus 10A and the domestic device 80 are installed in the home of a user, and the learning server 20 is installed in, for example, a distant security center of a service provider. The home apparatus 10A and the domestic device 80 are connected to each other so as to enable wired or wireless communication between them. The domestic device 80 is a device such as a home electrical appliance that has a communication interface and is installed in a home.

The learning server 20 is a computer that constructs an inference model of neural network-based image recognition processing, and includes a storage unit 21 and a learning unit 22. The storage unit 21 is stored with a learning data set. The learning unit 22 constructs an inference model by learning using the learning data set stored in the storage unit 21. And the learning unit 22 transmits information (model data) of the constructed inference model to the home apparatus 10A installed in the user home.

The home apparatus 10A is a device for taking an image of the home of the user, performing image recognition processing on resulting image data, and notifying the domestic device 80 of an inference result of the image recognition processing. The home apparatus 10A includes a camera module 11 and an inference device 12. The home apparatus 10A is a small device of a light bulb type (attachable to a light bulb socket), a dome type (installed on a ceiling), or the like. Inside the home apparatus 10A, the camera module 11 and the inference device 12 are mounted on a single board 19.

The camera module 11 takes an image, encrypts resulting image data by a homomorphic encryption method, and sends encrypted image data to the inference device 12. Since only encrypted image data is output from the camera module 11, an original image cannot be restored even if it suffers network eavesdropping. Furthermore, the camera module 11 has such an internal configuration as to prevent a leak of plaintext image data (described later in detail).

The camera module 11 receives, from the inference device 12, an inference result of image recognition processing on image data that is kept encrypted, decrypts it into plaintext data, and transmits an inference result of the plaintext data to the domestic device 80.

The inference device 12 receives model data from the learning server 20 and constructs a neural network of an inference model on the basis of the model data. Since the inference device 12 receives model data that has been encrypted by the homomorphic encryption method and is kept encrypted, the neural network thus constructed is one for performing image recognition processing in a homomorphic encryption space. Thus, the inference device 12 converts inference model computation into computation in the homomorphic encryption space and has resulting computation expressed in a neural network.

Furthermore, the inference device 12 receives encrypted image data from the camera module 11, performs inference model-based image recognition processing on it in the homomorphic encryption space, and sends an inference result to the camera module 11. Since the inference device 12 performs image recognition processing in the homomorphic encryption space without decrypting encrypted image data, a resulting inference result is also an encrypted one.

For example, the inference device 12 is a neural network processing device that includes a CPU (central processing unit; not shown) and a RAM (random access memory; not shown). The inference device 12 performs image recognition processing in such a manner that the CPU runs software programs and develops image data in the RAM.

If image data were not encrypted, there would be risk that a malignant person sends spyware into the inference device 12, causes its CPU to run it, acquires image data from its RAM, and causes images to leak out. In contrast, in the embodiment, since the camera module outputs image data after encrypting it by the homomorphic encryption method and the inference device 12 processes the received image data in a state that it is kept encrypted, an event can be prevented that plaintext images are caused to leak out by spyware.

The domestic device 80 receives an inference result from the home apparatus 10A and performs prescribed processing on the basis of the inference result. For example, if it is inferred on the basis of the inference result that a suspicious person has intruded into a room, the domestic device 80 lights an alarm lamp (not shown), generates an alarm sound, notifies the user by e-mail, reports to the security center, and performs other necessary actions.

Figure 2:
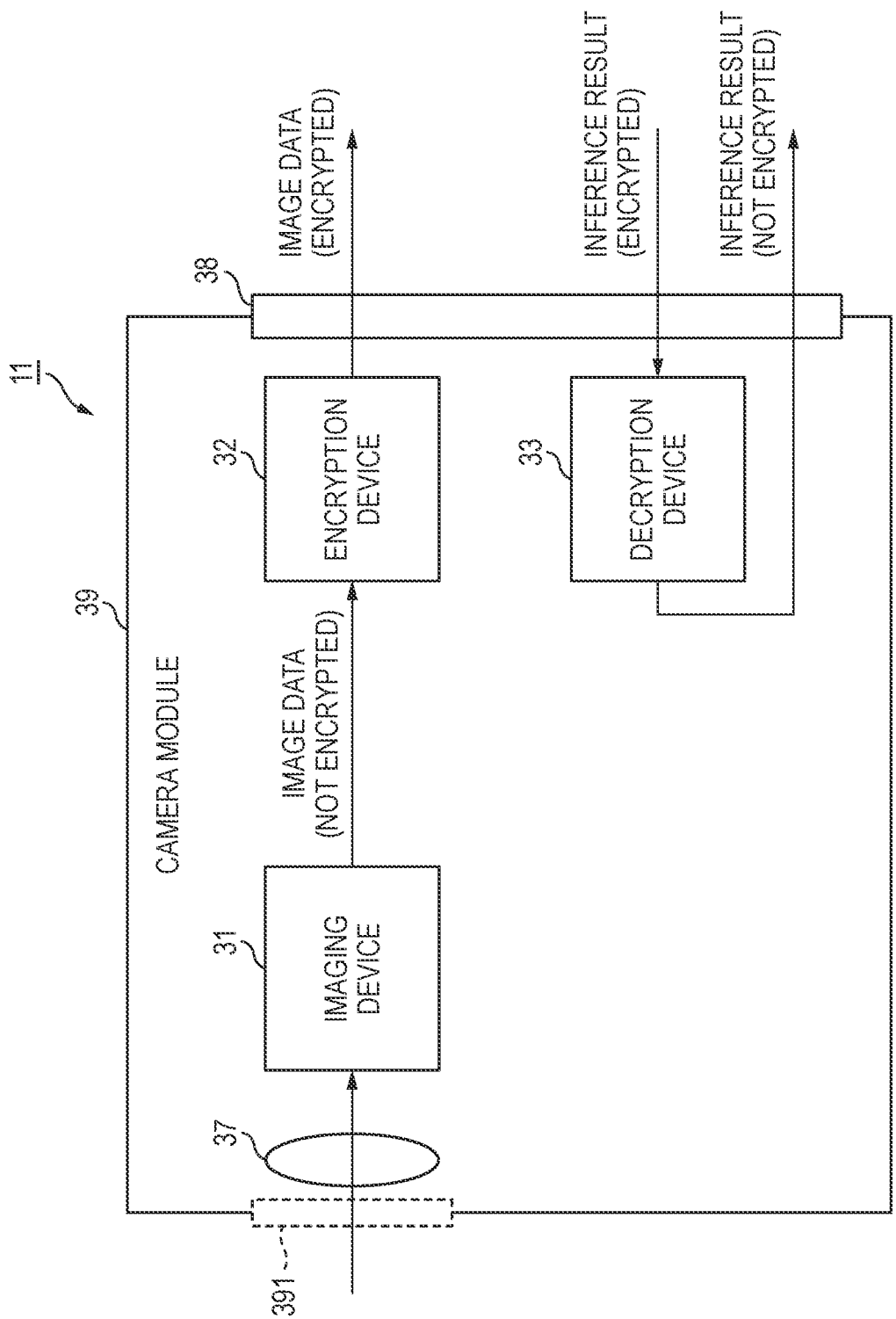
FIG. 2 is a block diagram of the camera module according to the first embodiment.

FIG. 2 is a block diagram of the camera module 11 according to the first embodiment. The camera module 11 includes an imaging device 31, an encryption device 32, a decryption device 33, an interface 38, and a housing 39. Two or more of the imaging device 31, the encryption device 32, and the decryption device 33 are mounted on the same board. For example, this may be done in such a manner that two or more of the imaging device 31, the encryption device 32, and the decryption device 33 are implemented as a single chip and the chip is mounted on a board. Where two or more of the imaging device 31, the encryption device 32, and the decryption device 33 are mounted on the same board, it is difficult to take out an internal signal from the board. For example, if the imaging device 31 and the encryption device 32 are mounted on the same board, it is difficult to take out plaintext image data.

The housing 39 houses the imaging device 31, the encryption device 32, and the decryption device 33 and has an opening 391 through which to receive input light.

The interface 38 connects the inside and the outside of the housing 39 and transmits signals. For example, the interface 38 is a terminal that is electrically connected to signal lines provided inside the housing 39 and is exposed to the outside of the housing 39.

An optical system 37 forms, on the imaging device 31, an image of light that comes through the opening 391.

The imaging device 31 converts the image of the light received via the optical system 37 into an electrical signal, and sends it to the encryption device 32 in the form of plaintext image data. The imaging device 31 converts the image of the light into an electrical signal by means of, for example, a CMOS image sensor (not shown).

The encryption device 32 encrypts the plaintext image data by the homomorphic encryption method and sends encrypted image data to the inference device 12. For example, the encryption device 32 encrypts the image data using a public key of homomorphic public-key cryptography. Encrypted image data is output from the interface 38.

The decryption device 33 decrypts an encrypted inference result that is received from the inference device 12 via the interface 38, and outputs a decryption result to the domestic device 80 via the interface 38. The data amount of an inference result that the decryption device 33 can decrypt in a prescribed time (i.e., a data decryption rate) is restricted so as to be sufficiently smaller than a data amount of image data that the encryption device 32 encrypts in the prescribed time (i.e., a data encryption rate). Since an inference result to be decrypted by the decryption device 33 is sufficiently smaller in data amount than image data to be encrypted by the encryption device 32, the above setting is suitable for the decryption of an inference result which is an intrinsic purpose of the decryption device 33.

Restricting the decryption throughput of the decryption device 33 in the above manner can prevent a leak of images. Where the decryption throughput of the decryption device 33 were not restricted, if the camera module 11 is manipulated by malignant hacking or the like, it would become possible to acquire plaintext image data by returning image data encrypted by the encryption device 32 to the decryption device 33 and having it decrypted there.

For example, where the camera module 11 employs a format HDTV/720p, the number of pixels per frame is equal to 1,280×720=921,600. If the number of coefficients that the decryption device 33 can decrypt per second is restricted to 128, it takes about two hours to decrypt image data of one frame. If the frame rate of the camera module 11 is 30 fps, it takes about 30 hours to decrypt image data of one second. This type of restriction makes images hard to leak.

Figure 3:
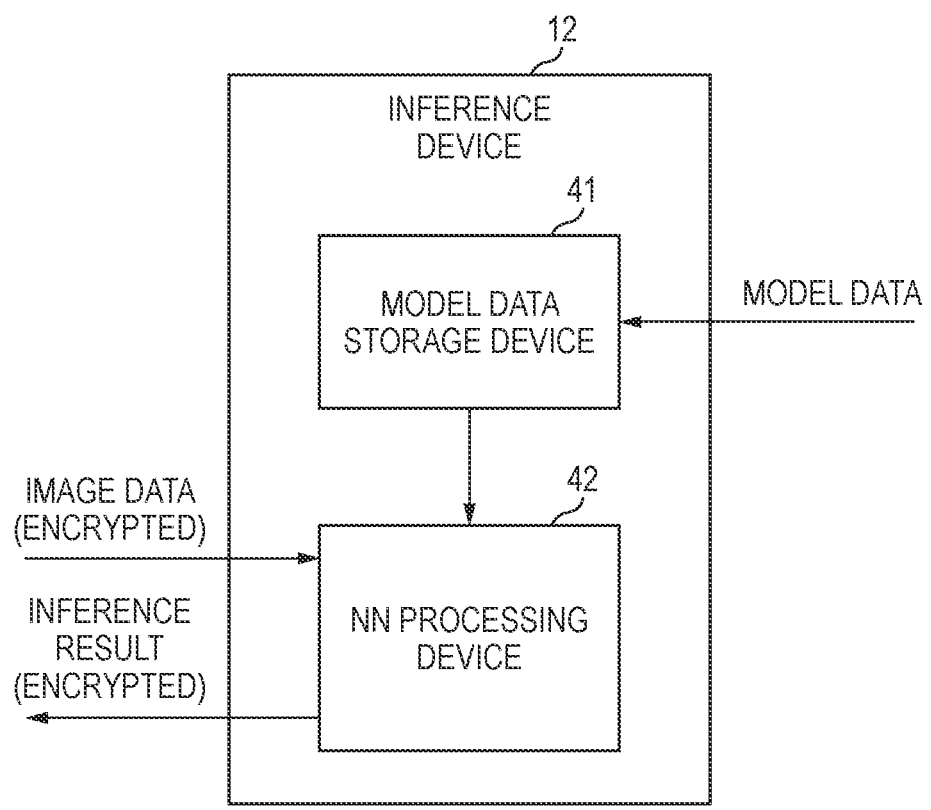
FIG. 3 is a block diagram of an inference device according to the first embodiment.

FIG. 3 is a block diagram of the inference device 12. The inference device 12 includes a model data storage device 41 and a neural network (NN) processing device 42.

The model data storage device 41 stores model data received from the learning server 20.

The NN processing device 42 constructs a neural network of an inference model in the homomorphic encryption space on the basis of the model data stored in the model data storage device 41, performs prescribed image recognition processing on encrypted image data received from the camera module 11 using the constructed inference model, and sends an inference result of the image recognition processing to the camera module 11. Since the neural network inference model performs image recognition processing in the homomorphic encryption space without decrypting encrypted image data, an inference result obtained is an encrypted one.

As described above, in the embodiment, the camera module (imaging module) 11 includes the imaging device 31 for converting an input optical image into image data, the encryption device 32 for encrypting the image data by the homomorphic encryption method, and the interface 38 for outputting the encrypted image data received from the encryption device 32. Since the imaging device 31 and the encryption device 32 are integrated with each other, it is difficult to take out plaintext image data to outside the module and a leak of images can be prevented.

The camera module 11 according to the embodiment further includes the decryption device 33 for decrypting a result signal that has been encrypted by the homomorphic encryption method, that is, a result of processing on encrypted image data that was output from the encryption device 32. And the interface 38 receives the result signal to be decrypted and outputs a decrypted result signal. Since the camera module 11 further includes the decryption device 33 for decrypting encrypted data by homomorphic encryption, an inference result of image recognition processing can be obtained plaintext by combining the decryption device 33 with the inference device 12 (image processing unit) which performs image recognition processing in the homomorphic encryption space. For example, the home apparatus 10A need not be included a decryption device separately from the camera module 11.

In the camera module 11 according to the embodiment, a data amount of an inference result that the decryption device 33 can decrypt in a prescribed time is smaller than a data amount of image data that the encryption device 32 can encrypt in the prescribed time. Since the throughput of the decryption device 33 is lower than that of the encryption device 32, it is possible to prevent from obtaining a sufficient decryption throughput when he or she tries to acquire plaintext images by causing the decryption device 33 to decrypt images encrypted by the encryption device 32 by manipulating the camera module 11 by a malignant hacking or the like. A leak of images can thereby be prevented.

In the embodiment, predetermined values are used as system parameters that are used for encryption and corresponding decryption, whereby notification of the system parameters is made unnecessary. Alternatively, a configuration is possible in which the system parameters are made variable and an encrypted signal is transmitted in such a manner that system parameters used are added to it. In this case, the encryption device 32 of the camera module 11 sends encrypted image data in such a manner that system parameters that have been used for encrypting image data are added to the encrypted image data. The inference device 12 refers to the system parameters added to the encrypted image data and uses them for image recognition processing in the homomorphic encryption space. The decryption device 33 decrypts an encrypted inference result received from the inference device 12 using the system parameters that were used in the encryption device 32.

Although in the embodiment the camera module 11 is configured in such a manner that the optical system 37 is housed in the housing 39, the camera module 11 may be configured in a different manner. For example, the whole or part of the optical system 37 may be disposed outside the camera module 11.

In the embodiment, the learning server 20 transmits plaintext model data to the inference device 12 of the home apparatus 10A and the inference device 12 constructs a neural network of an inference model in the homomorphic encryption space on the basis of the model data; however, other configurations are possible. For example, a configuration is possible in which the learning server 20 converts model data so that an inference model can be constructed in the homomorphic encryption space and sends the converted model data to the home apparatus 10A and the inference device 12 of the home apparatus 10A uses the received model data as it is. For another example, a configuration is possible in which the learning server 20 learns using an activation function that is most suitable for the homomorphic encryption method and sends model data of a resulting inference model to the home apparatus 10A.

Although in the embodiment the camera module 11 and the inference device 12 are provided in the home apparatus 10A, other configurations are possible. For example, a configuration is possible in which the inference device 12 is provided in a distant server rather than in the home apparatus 10A, encrypted image data is transmitted from the home apparatus 10A to the server over a communication network, and the server performs image recognition processing on image data and returns a resulting inference result to the home apparatus 10A. Since the server performs image recognition processing on image data, the load of the home apparatus 10A can be reduced. Furthermore, a leak of images can be prevented because image data is transmitted over the communication network in encrypted form.

Pieces of processing performed by the imaging device 31 and the encryption device 32 of the camera module 11 according to the embodiment may be implemented as software programs and performed by a processor. Processing that is performed by the decryption device 33 may also be implemented as software programs and performed by a processor.

Embodiment 2

In the home security system according to the first embodiment, the home apparatus transmits an inference result of image recognition processing to a domestic device and the domestic device performs prescribed processing on the basis of the inference result. In contrast, a second embodiment is directed to home automation in which a home apparatus controls a domestic device on the basis of an inference result of image recognition processing. For example, a TV receiver, an audio apparatus, an illumination device, or an air-conditioner, or the like domestic device is controlled on the basis of an inference result of image recognition processing by home apparatus.

Figure 4:
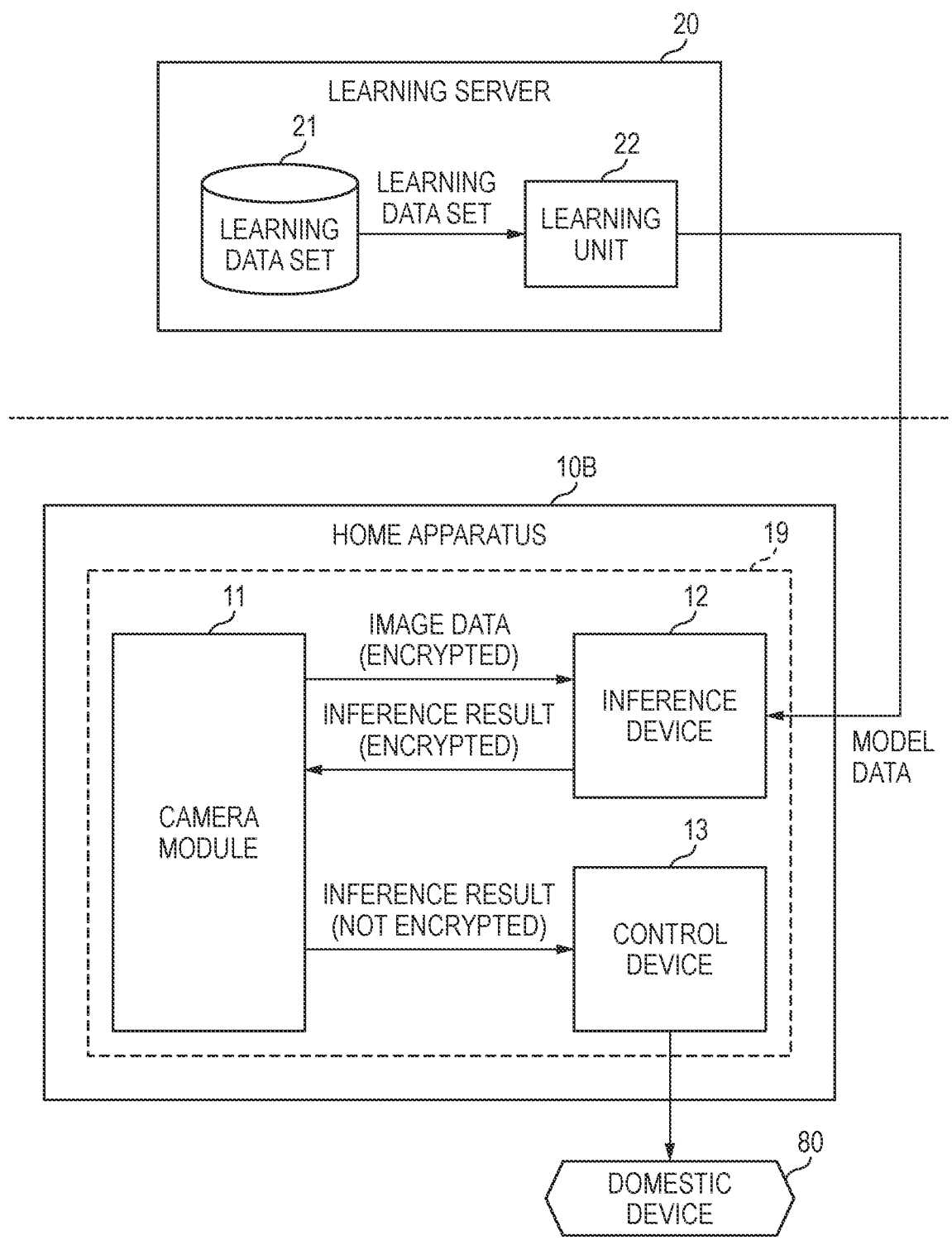
FIG. 4 is a block diagram of a home automation system according to a second embodiment.

FIG. 4 is a block diagram of a home automation system according to the second embodiment. The home automation system according to this embodiment includes a home apparatus 10B, a learning server 20, and a domestic device 80. The home apparatus 10B and the domestic device 80 are installed in the home of a user, and the learning server 20 is installed in a distant service center. The home apparatus 10B can communicate with the service center over a communication network. The home apparatus 10B and the domestic device 80 are connected to each other so as to enable wired or wireless communication between them.

For example, the home apparatus 10B is a controller that incorporates a small camera and can be set on a table. The home apparatus 10B includes a camera module 11, an inference device 12, and a control device 13 which are mounted on a single board 19.

The camera module 11 and the inference device 12 are the same in configuration as those according to the first embodiment.

The control device 13 transmits a control signal to the domestic device 80 on the basis of a plaintext inference result (inference result of plaintext) receive from the camera module 11 and performs a prescribed control on the domestic device 80.

The domestic device 80 is a device such as a home electrical appliance that has a communication interface and is installed in a home. The domestic device 80 performs a prescribed operation according to a control signal received from the control device 13. For example, the domestic device 80 can turn on an air-conditioner installed in a room where the user exists and turn off an air-conditioner installed in a room where no person exists. For another example, the domestic device 80 can turn on or off a TV receiver or an audio apparatus by making a prescribed gesture.

Embodiment 3

In the second embodiment, as shown in FIG. 4, the inference device 12 and the control device 13 are implemented separately. However, if a configuration is assumed that in each of the inference device 12 and the control device 13 a CPU performs processing by running software programs and developing data in a RAM, it is possible to implement the inference device 12 and the control device 13 as a single device by sharing hardware such as the CPU and the RAM. The third embodiment is directed to a configuration that the inference device 12 and the control device 13 shown in FIG. 4 are implemented as a single device.

Figure 5:
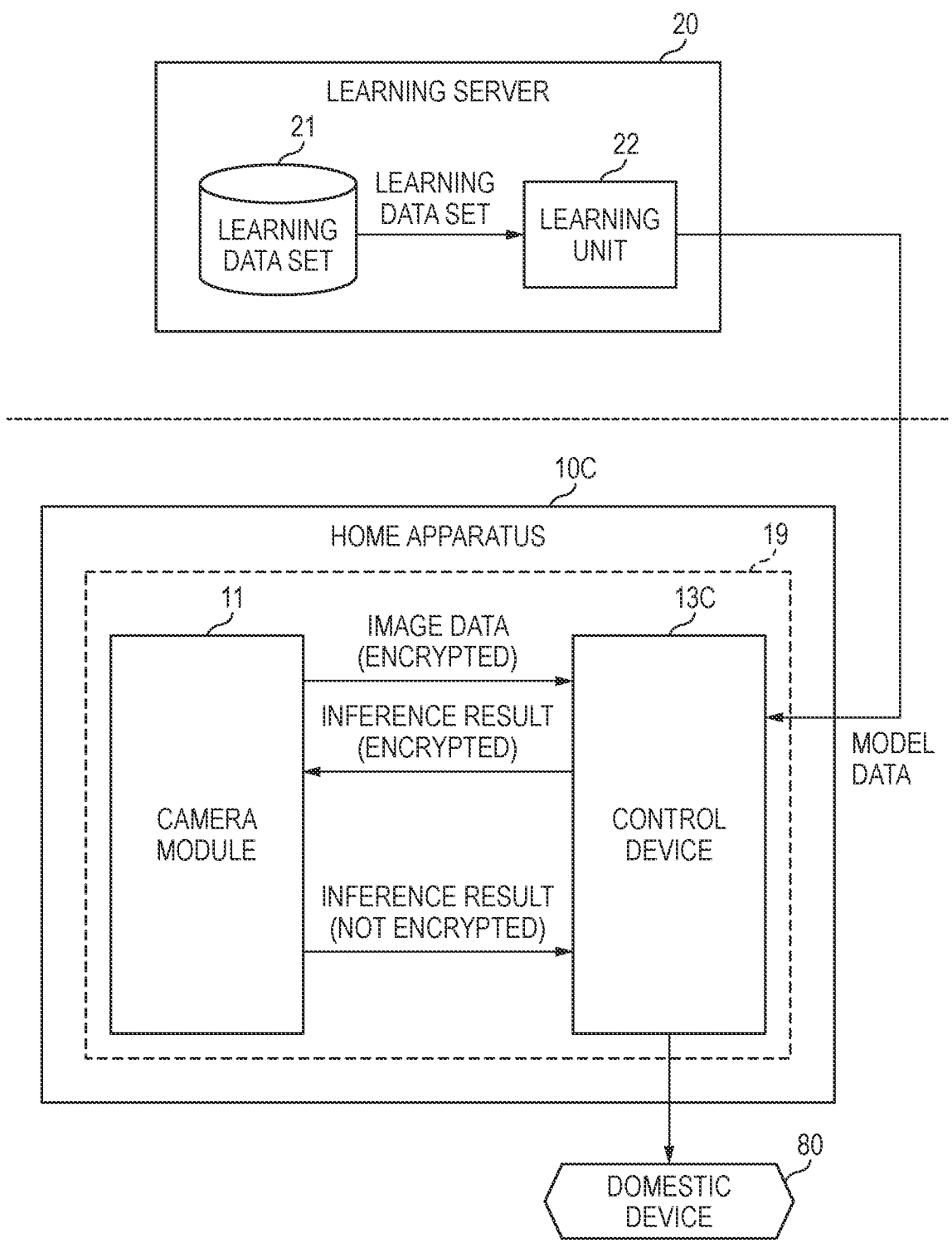
FIG. 5 is a block diagram of a home automation system according to a third embodiment.

FIG. 5 is a block diagram of a home automation system according to the third embodiment. The home automation system according to this embodiment is different from that according to the second embodiment in that the former includes a control device 13C in place of the inference device 12 and the control device 13 shown in FIG. 4. The camera module 11 and the control device 13C are mounted on a single board 19.

The control device 13C has the functions of both of the inference device 12 and the control device 13 shown in FIG. 4 that are according to the second embodiment. That is, the control device 13C receives model data from the learning server 20 and constructs a neural network of an inference model on the basis of the received model data. Furthermore, the control device 13C receives encrypted image data from the camera module 11, performs inference model-based image recognition processing in the homomorphic encryption space, and sends an inference result to the camera module 11. Still further, the control device 13C performs a prescribed control on the domestic device 80 by sending a control signal on the basis of a plaintext inference result received from the camera module 11.

Embodiment 4

In the second embodiment, as shown in FIG. 4, the decryption device 33 for decrypting an inference result that is encrypted in the homomorphic encryption method is incorporated in the camera module 11. In contrast, the fourth embodiment is directed to a configuration that such a decryption device is configured so as to be separate from a camera module.

Figure 6:
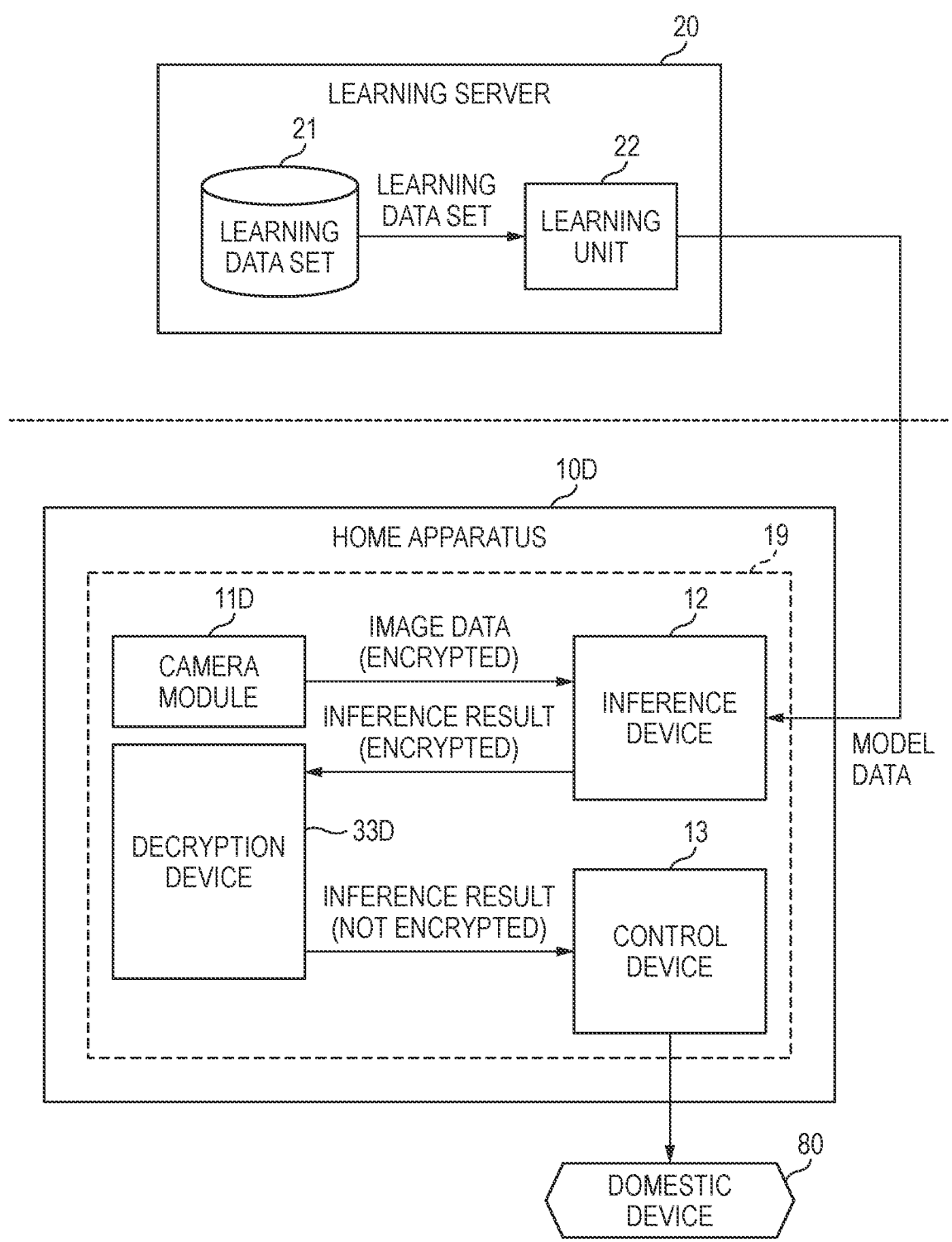
FIG. 6 is a block diagram of a home security system according to a fourth embodiment.

FIG. 6 is a block diagram of a home security system according to the fourth embodiment. The home security system according to this embodiment is different from that according to the second embodiment in that in a home apparatus 10D an decryption device 33D is provided separately from a camera module 11D. The home apparatus 10D includes the camera module 11D, the inference device 12, the control device 13, and the decryption device 33D. In the home apparatus, the camera module 11D, the inference device 12, control device 13, and the decryption device 33D are mounted on a single board 19. The inference device 12, and the control device 13 according to the fourth embodiment is the same as that according to the second embodiment. The camera module 11D takes an image, encrypts resulting image data by the homomorphic encryption method, and sends the encrypted image data to the inference device 12. The decryption device 33D receives an inference result, kept encrypted, of image recognition processing performed on the image data, decrypts the inference result, and sends a plaintext inference result to the control device 13. The control device 13 performs a prescribed control on the domestic device 80 by sending a control signal on the basis of a plaintext inference result received from the decryption device 33D.

Figure 7:
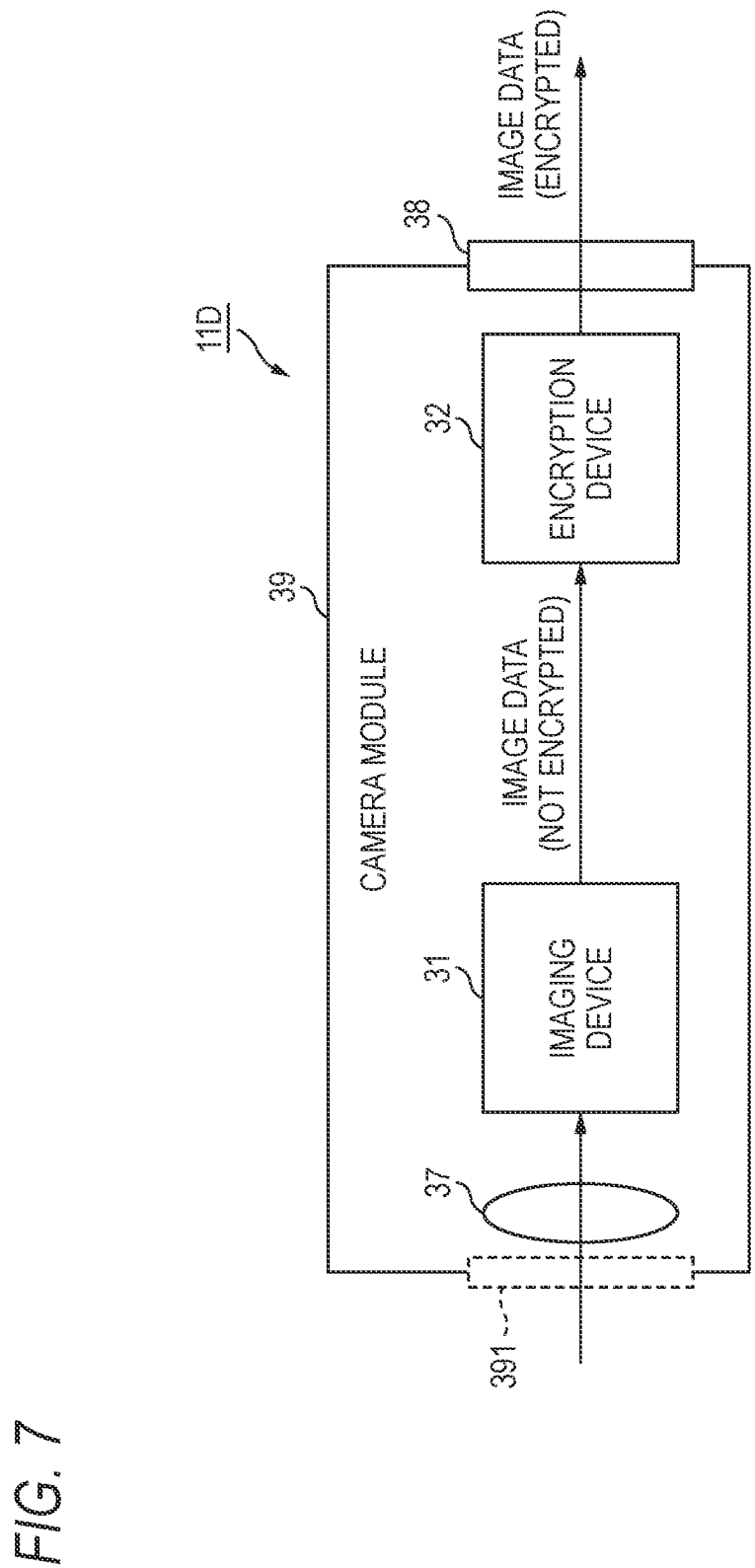
FIG. 7 is a block diagram of a camera module according to the fourth embodiment.

FIG. 7 is a block diagram of the camera module according to the fourth embodiment. The camera module 11D according to this embodiment includes an imaging device 31, an encryption device 32, an optical system 37, an interface 38, and a housing 39. The imaging device 31 and the encryption device 32 are mounted on the same board. For example, this may be done in such a manner that the imaging device 31 and the encryption device 32 are implemented as a single chip and the chip is mounted on a board.

The imaging device 31, the encryption device 32, and the optical system 37 that are according to the fourth embodiment are the same as those according to the second embodiment. The housing 39 according to the fourth embodiment is basically the same as that according to the second embodiment and is different from the latter in not housing the decryption device 33D. The interface 38 according to the fourth embodiment is basically the same as that according to the second embodiment and is different from the latter in not receiving an encrypted inference result and not outputting a plaintext inference result.

Embodiment 5

The first embodiment is directed to the case that the home apparatus 10A transmits an inference result obtained by image recognition processing to the domestic device 80 which is installed in the home. In contrast, a fifth embodiment is directed to a case that a home apparatus notifies an outside server of an inference result. In a home security system according to this embodiment, the home apparatus notifies the server of an inference result and the server performs prescribed processing on the basis of the received inference result.

Figure 8:
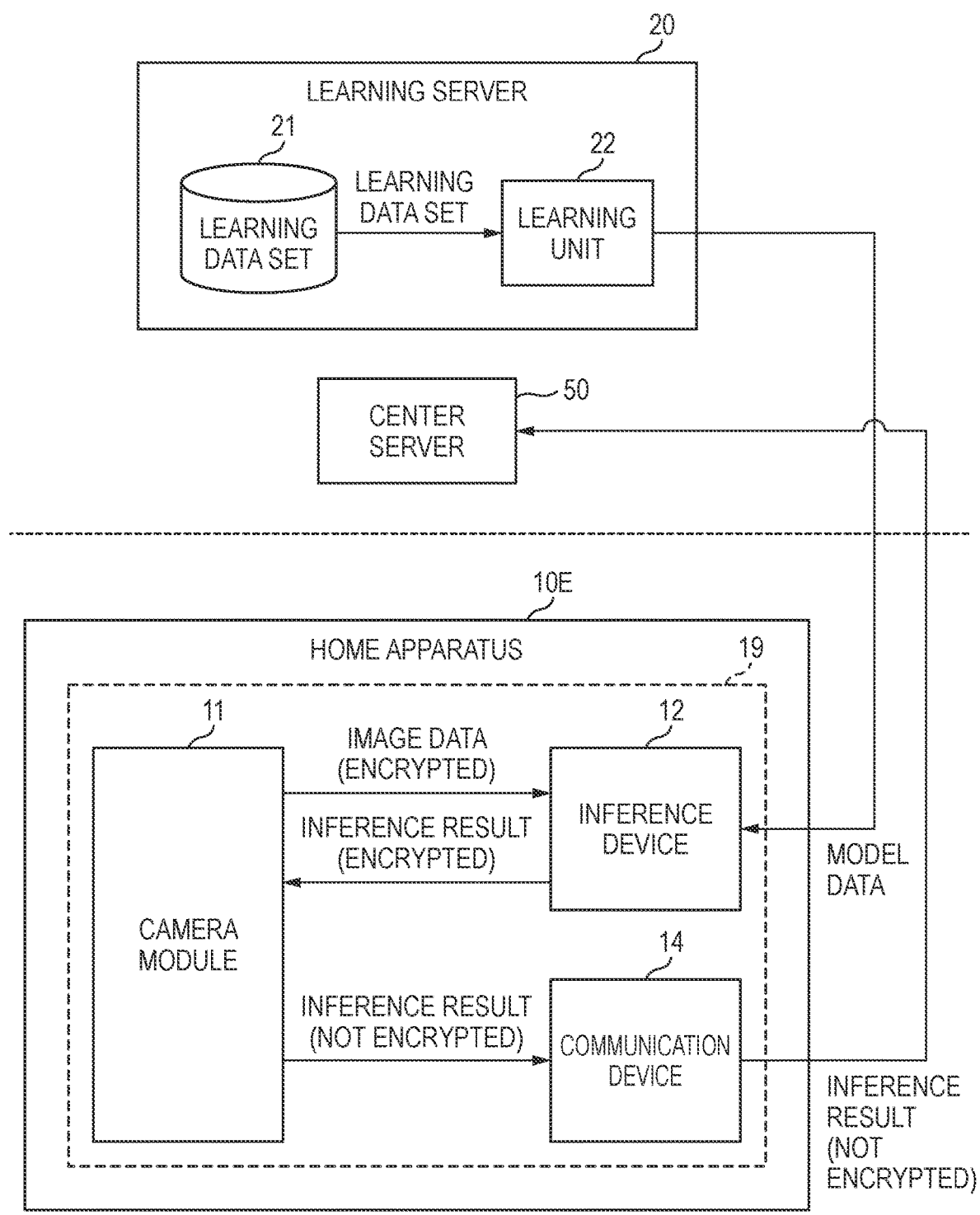
FIG. 8 is a block diagram of a home security system according to a fifth embodiment.

FIG. 8 is a block diagram of the home security system according to the fifth embodiment. The home security system according to this embodiment is different from that according to the first embodiment (see FIG. 1) in that the home apparatus 10E includes a communication device 14. In the home apparatus 10E, a camera module 11, an inference device 12, and the communication device 14 are mounted on a single board 19.

The communication device 14 is a communication device that communicates with a distant center server 50 over a communication network. The communication device 14 transmits, to the center server 50, a plaintext inference result received from the camera module 11.

The center server 50 is a server that is installed in, for example, a home security center and provides home security services. For example, when receiving, from the home apparatus 10E, an inference result that a suspicious person has intruded a user home, the center server 50 issues an alarm and causes a guard standing by to be dispatched.

Embodiment 6

The first embodiment is directed to the case that encryption keys (public key and private key) used by the camera module 11 are fixed. In contrast, in a sixth embodiment, the encryption keys are switched every image frame. Furthermore, in the sixth embodiment, an upper limit is set for the number of times a decryption device of a cameral module can perform decryption per each image frame.

Figure 9:
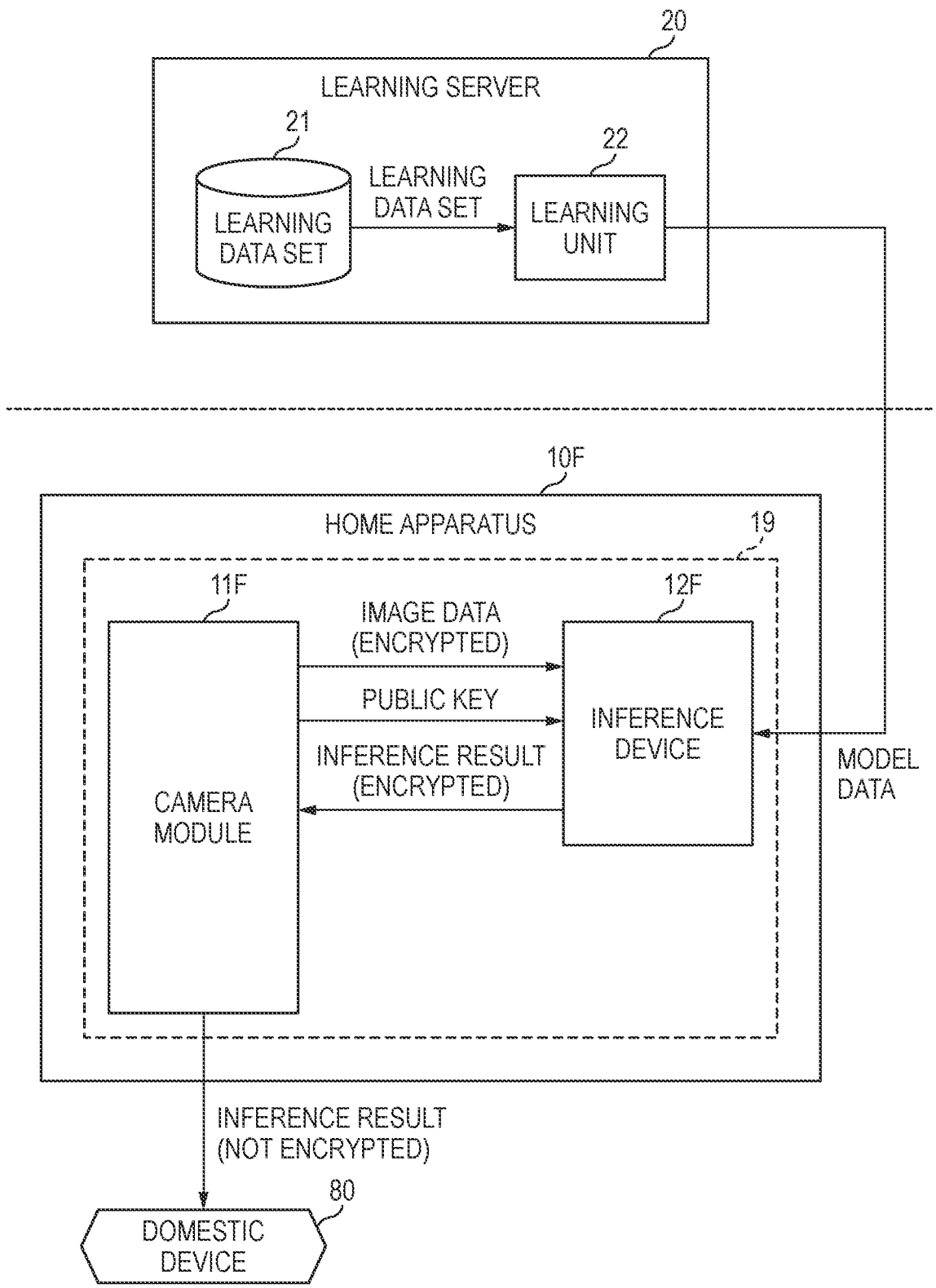
FIG. 9 is a block diagram of a home security system according to a sixth embodiment.

FIG. 9 is a block diagram of a home security system according to the sixth embodiment. As shown in FIG. 9, a home apparatus 10F includes a camera module 11F and an inference device 12F. The camera module 11F and the inference device 12F are mounted on a single board 19.

The camera module 11F encrypts image data while switching the public key used for the encryption every image frame and sends encrypted image data and public keys used to the inference device 12F. The inference device 12F performs image recognition processing on the encrypted image data that has been encrypted, using public keys.

In the image recognition processing of the embodiment, image data that has been encrypted by the homomorphic encryption method is processed being kept encrypted. There may occur a case that the calculation of image recognition processing performed on image data that has been encrypted by the homomorphic encryption method includes addition of constants, that is, the image recognition processing needs to use encrypted constants. In this embodiment, a public key is given to the inference device 12F and the inference device 12F performs the calculation of image recognition processing by encrypting the constants using the public key.

In the camera module 11F, the encryption keys that are used for encryption are switched every image frame. And, in the decryption of an inference result, an upper limit is set for the number of coefficients that can be decrypted per image frame. The upper limit is set approximately at a number with which coefficients included in an encrypted inference result of a neural network can be decrypted. For example, the upper limit is set at 128. This makes it possible to prevent a malignant person from decrypting images.

More specifically, even if a malignant neural network is constructed that returns an output of an encryption device to a decryption device, allowing decryption of a maximum of only 128 coefficients per frame makes it difficult to decrypt an original image. Since the original image includes pixels of a far larger number than the number of coefficients of an inference result, decryption of the original image requires a sufficiently large amount of information than decryption of coefficients for decryption of a result of inference calculation of the neural network. Thus, although the camera module 11F can decrypt an inference result of the neural network, it is difficult for the camera module 11F to decrypt the original image.

Figure 10:
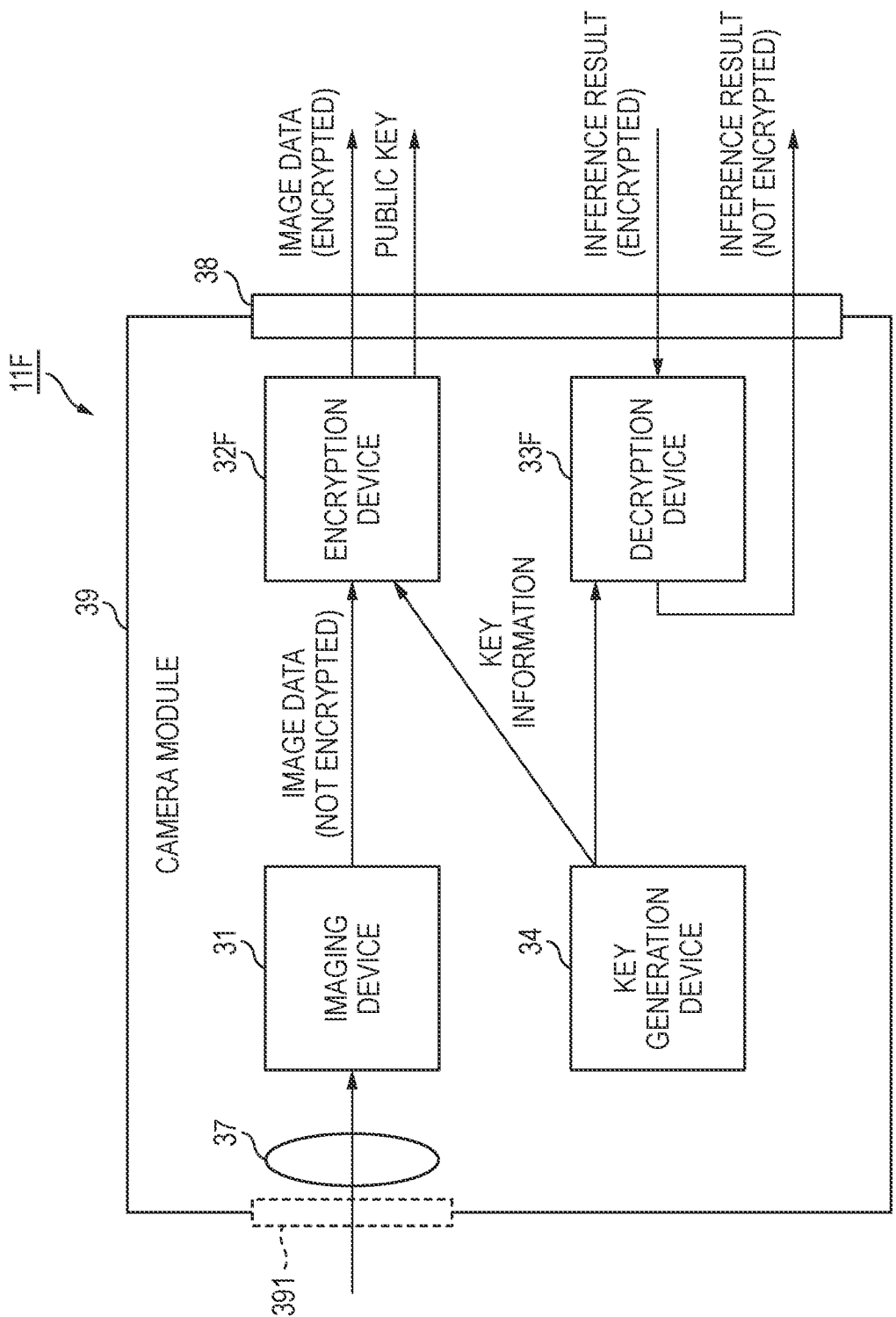
FIG. 10 is a block diagram of a camera module according to the sixth embodiment.

FIG. 10 is a block diagram of the camera module according to the sixth embodiment. As shown in FIG. 10, the camera module 11F includes an imaging device 31, an encryption device 32F, a decryption device 33F, a key generation device 34, an optical system 37, an interface 38, and a housing 39. In the camera module 11F, two or more of the imaging device 31, the encryption device 32F, the decryption device 33F, and the key generation device 34 are mounted on the same board. For example, this may be done in such a manner that two or more of the imaging device 31, the encryption device 32F, the decryption device 33F, and the key generation device 34 are implemented as a single chip and the chip is mounted on aboard. Where two or more of the imaging device 31, the encryption device 32F, the decryption device 33F, and the key generation device 34 are mounted on the same board, it is difficult to take out an internal signal from the board.

The imaging device 31 and the optical system 37 according to the sixth embodiment are the same as those according to the first embodiment (see FIG. 2).

The housing 39 according to the sixth embodiment is basically the same as that according to the first embodiment and is different from the latter in also housing the key generation device 34.

The interface 38 according to the sixth embodiment is basically the same as that according to the first embodiment and is different from the latter in also outputting a public key to the inference device 12F.

The key generation device 34 generates a public key and a private key in such a manner that they vary every image frame.

The encryption device 32F according to the sixth embodiment encrypts image data using different public keys each of which is generated every image frame.

The decryption device 33F according to the sixth embodiment decrypts an encrypted inference result using different private keys each of which is generated by the key generation device 34 every image frame. Then, the decryption device 33F restricts the number of coefficients to be decrypted using one private key to a prescribed number and does not decrypt further coefficients.

As described above, in this embodiment, the camera module 11F includes the key generation device 34 for generating a public key and a private key every image frame. The encryption device 32F encrypts pixel vales of each image frame using a dedicated public key. In decrypting an inference result using private keys, the decryption device 33F sets a prescribed upper limit for the number of times decryption can be performed using one private key.

Since the private key is switched every image frame and the number of times decryption can be performed using one private key is restricted, even if a malignant hacker, for example, tries to acquire plaintext images by causing the decryption device 33F to decrypt images encrypted by the encryption device 32F by manipulating the camera module 11F, pixel values of a sufficient number of pixels cannot be decrypted for each image frame, whereby a leak of images can be prevented.

In the camera module 11F according to the embodiment, the interface 38 outputs encrypted image data and a public key. The inference device 12F receives the encrypted image data and the public key, encrypts constants using the public key, and uses the encrypted constants in image processing on image data. Since camera module 11F sends the public key to be used for encryption of homomorphic encryption to the inference device 12F, the inference device 12F can perform image processing on homomorphic encryption including constants by encrypting the constants using the public key.

In the embodiment, decryption of image data by a malignant person is made difficult by switching the public key every image frame and restricting the number of coefficients that can be decrypted using each private key. However, other configurations are possible. For example, a configuration is possible in which the encryption device 32F adds a time stamp indicating an encryption time to encrypted image data in outputting it and the decryption device 33F refers to the time stamp added to an input signal. Then if a time longer than or equal to a prescribed threshold time has not elapsed from the time indicated by the time stamp, the encryption device 32F decrypts the input signal. If a time longer than or equal to the prescribed threshold time has elapsed from the time indicated by the time stamp, the encryption device 32F do not decrypts the input signal. This measure restricts the decryption throughput of the decryption device 33F and can thereby prevents malignant decryption of image data. Setting the decryption throughput properly can make it difficult to decrypt original images which are large in information amount while allowing decryption of an inference result of a neural network which is relatively small in information amount.

It is possible to implement, as software programs, pieces of processing of the imaging device 31, the encryption device 32F, the decryption device 33F, and the key generation device 34 of the camera module 11F according to the embodiment and causes a processor to run those software programs.

Figure 11:
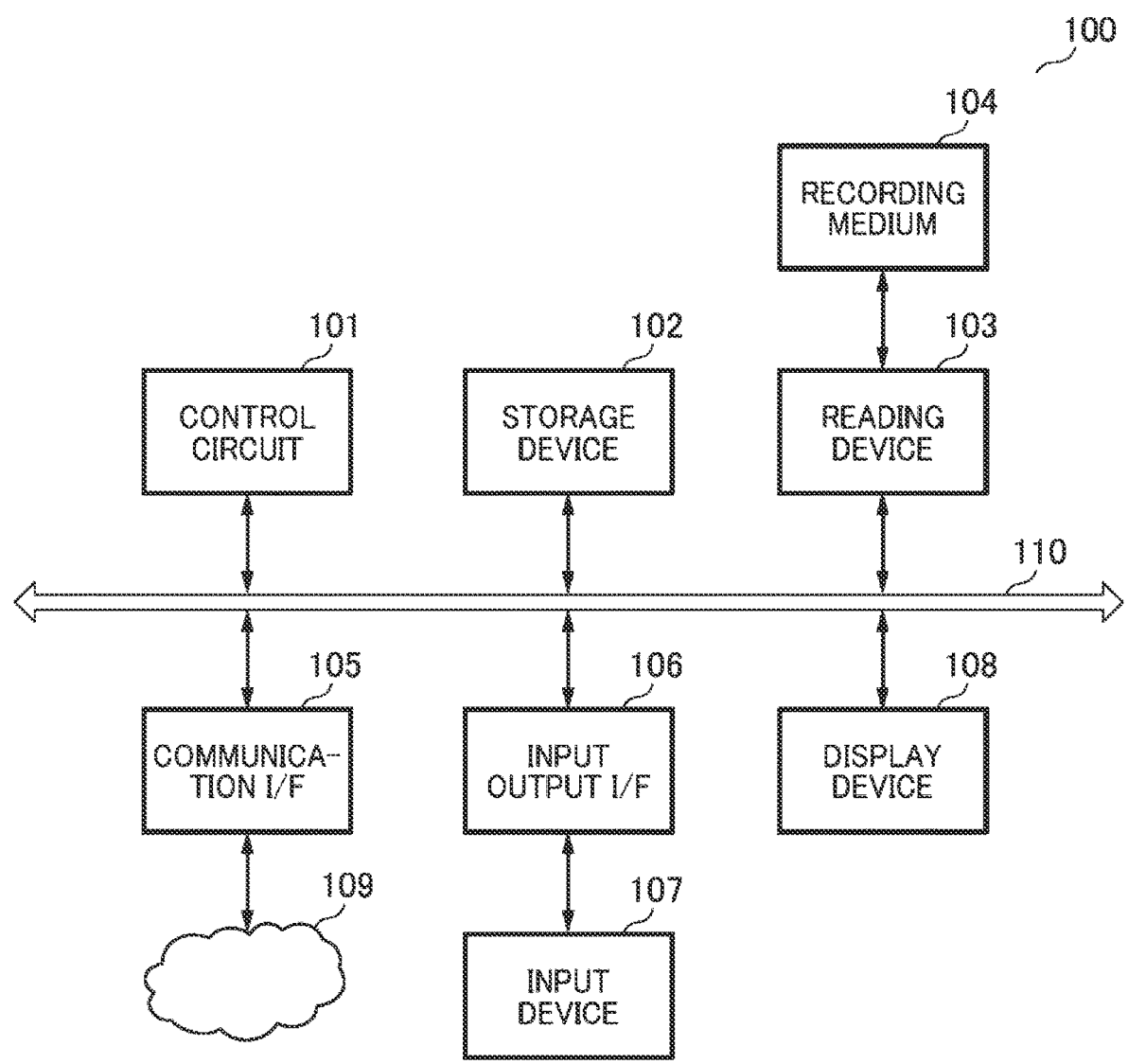
FIG. 11 is a block diagram illustrating an example of a computing apparatus.

FIG. 11 is a block diagram illustrating an example of a computing apparatus. A configuration of a computing apparatus 100 will be described with reference to FIG. 11.

The computing apparatus 100 is an information processing device including a control circuit 101, a storage device 102, a reading device 103, a recording medium 104, a communication interface 105, an input and output interface 106, an input device 107, and a display device 108. In addition, the communication interface 105 is connected to a network 109. Respective configuration elements are connected to each other by a bus 110. The home device 10A-10F, the learning server 20, and the domestic device 80 may be configured by appropriately selecting apart or all of the components described in the computing apparatus 100.

The control circuit 101 controls the entire computing apparatus 100. The control circuit 101 is, for example, a processor such as a Central Processing Unit (CPU), a Field Programmable Gate Array (FPGA), or a Programmable Logic Device (PLD).

The control circuit 101 functions, for example, as the control device 13 and 13C, the learning unit 22, the imaging device 31, the encryption device 32 and 32F, the decryption device 33, 33D and 33F, the key generation device 34, and the NN processing device 42.

The storage device 102 stores various data. The storage device 102 is, for example, a memory such as a Read Only Memory (ROM) and a Random Access Memory (RAM), a Hard Disk (HD), or the like. In addition, the storage device 102 functions, for example, as the model data storage device 41. When the storage device 102 is used in the learning server 20, for example, the storage device 102 may store the learning data set 21.

In addition, the ROM stores a program such as a boot program. The RAM is used as a work area of the control circuit 101. The HD stores programs such as an OS, an application program, and firmware and data.

The storage device 102 may store a program that causes the control circuit 101 to function as, for example, the control device 13 and 13C, the learning unit 22, the imaging device 31, the encryption device 32 and 32F, the decryption device 33, 33D and 33F, the key generation device 34, and the NN processing device 42.

The home device 10A-10F read out the program stored in the storage device 102 to the RAM when various processes are performed. The program read out to the RAM is executed by the control circuit 101, so that the home device 10A-10F respectively execute the control processing, the encryption processing, the decryption processing, the key generation processing, and the NN processing. The learning server 20 read out the program stored in the storage device 102 to the RAM when various processes are performed. The program read out to the RAM is executed by the control circuit 101, so that the learning server 20 execute the imaging processing.

Moreover, each program described above may be stored in the storage device of a server on the network 109 as long as the control circuit 101 can access each program via the communication interface 105.

The reading device 103 is controlled by the control circuit 101 to read/write of data of the detachable recording medium 104. The reading device 103 is, for example, various disk drives, a Universal Serial Bus (USB), or the like.

The recording medium 104 stores various data. The recording medium 104 stores, for example, a program for executing at least one of a control processing, the learning processing, the imaging processing, the encryption processing, the decryption processing, the key generation processing, and the NN processing. Furthermore, the recording medium 104 may store at least one of the learning data set, and the model data. The recording medium 104 is connected to the bus 110 via the reading device 103 and the control circuit 101 controls the reading device 103, so that read/write of the data is performed.

In a case where the learning data set 21 is recorded in the recording medium 104, the learning server 20 may acquire the learning data set 21 by reading the learning data set 21 from the recording medium 104. In a case where the model data is recorded in the recording medium 104, the inference device 12 and 12F may acquire the model data by reading the model data from the recording medium 104.

In addition, the recording medium 104 is, for example, a non-transitory computer readable recording medium (non-volatile computer readable recording medium) such as a SD Memory Card, a Floppy Disk (FD), a Compact Disc (CD), a Digital Versatile Disk (DVD), a Blu-ray Disk (BD: registered trademark), a flash memory, or the like.

The communication interface 105 causes the computing apparatus 100 and another device to connect to each other via the network 109 to be communicable with each other. In addition, the communication interface 105 may include an interface having a function of a wireless LAN and an interface having a short-range wireless communication function. The wireless LAN interface may support, for example, Wi-Fi (registered trademark) as a wireless LAN standard. The short-range wireless interface may support, for example, Bluetooth (registered trademark) as a short-range wireless communication standard. The LAN stands for Local Area Network.

The communication interface 105 functions as, for example, the communication device 14 and the interface 38.

The input and output interface 106 is connected to, for example, the input device 107 such as a keyboard, a mouse, and a touch panel, and outputs a signal input via the bus 110 to the control circuit 101 when a signal indicating various kinds of information is input from the connected input device 107. In addition, when a signal indicating various kinds of information is output from the control circuit 101 via the bus 110, the input and output interface 106 outputs the signal to various connected devices.

The input and output interface 106 functions as, for example, the communication device 14 and the interface 38.

The display device 108 displays various kinds of information. The display device 108 may display information for receiving an input on the touch panel.

In addition, the input and output interface 106, the input device 107, and the display device 108 may function as a Graphical User Interface (GUI). Therefore, the computing apparatus 100 receives an intuitive operation by the touch panel, the mouse, or the like.

The network 109 is, for example, a LAN, wireless communication, an Internet, or the like, and causes the computing apparatus 100 and another device to connect to each other to be communicable with each other. The home device 10A-10F, the learning server 20, the center server 50, and the domestic device 80 may be connected to each other so as to be communicable with each other via the network 109.

Moreover, embodiments are not limited to the forms described above, and various modifications or variations can be adopted in a range without departing from the gist of the present embodiment.

What is claimed is:

1. A non-transitory computer readable recording medium storing an image processing program which causes a processor of an imaging module to execute:
   converting an input optical image into image data;
   encrypting the image data by a homomorphic encryption method;
   outputting the encrypted image data;
   receiving a result signal that is encrypted by the homomorphic encryption method and is a result of processing performed on the encrypted image data;
   decrypting the result signal; and
   outputting the decrypted result signal,
   wherein a data amount of the result signal that can be decrypted by the decrypting in a prescribed time is smaller than a data amount of the image data that can be encrypted by the encrypting in the prescribed time.

2. The non-transitory computer readable recording medium storing the image processing program according to claim 1, wherein the outputting of the encrypted image data further comprises outputting a public key.

3. The non-transitory computer readable recording medium storing the image processing program according to claim 1, wherein the image processing program further causes the processor of the imaging module to execute:
   generating a public key with which a constant to be used in an inference process is to be encrypted, wherein
   the outputting of the encrypted image data further comprises outputting the encrypted image data and the public key to an inference device which encrypts, with the public key, the constant to be used in the inference process and performs, with the encrypted image data that is not decrypted, the inference process, and
   the receiving comprises receiving the encrypted result signal that is inferred in the inference device with the encrypted image data.

4. A non-transitory computer readable recording medium storing an image processing program which causes a processor of an imaging module to execute:
   converting an input optical image into image data;
   encrypting the image data by a homomorphic encryption method;
   adding a time stamp to the encrypted image data and outputting the encrypted image data;
   receiving an input signal;
   referring to a time stamp added to the input signal;
   when a time longer than or equal to a prescribed threshold time has not elapsed from a time indicated by the time stamp, decrypting the input signal, which is a result signal that is encrypted by the homomorphic encryption method and is a result of processing performed on the encrypted image data and outputting the decrypted result signal; and
   when a time longer than or equal to the prescribed threshold time has elapsed from the time indicated by the time stamp, abstaining from decrypting the input signal.

5. The non-transitory computer readable recording medium storing an image processing program according to claim 4, wherein the outputting of the encrypted image data further comprises outputting a public key.

6. The non-transitory computer readable recording medium storing the image processing program according to claim 4, wherein the image processing program further causes the processor of the imaging module to execute:
   generating a public key with which a constant to be used in an inference process is to be encrypted, wherein
   the outputting of the encrypted image data further comprises outputting the encrypted image data and the public key to an inference device which encrypts, with the public key, the constant to be used in the inference process and performs, with the encrypted image data that is not decrypted, the inference process, and
   the receiving comprises receiving the encrypted result signal that is inferred in the inference device with the encrypted image data.

7. A non-transitory computer readable recording medium storing an image processing program which causes a processor of an imaging module to execute:
   converting an input optical image into image data;
   generating a public key and a private key every image frame;
   encrypting the image data by a homomorphic encryption method;
   outputting the encrypted image data;
   receiving a result signal that is encrypted by the homomorphic encryption method and is a result of processing performed on the encrypted image data;
   decrypting the result signal; and
   outputting the decrypted result signal, wherein the encrypting comprises encrypting pixel values of each image frame with a public key that is dedicated to the image frame, and the decrypting comprises decrypting the result signal with the private key such that a number of times decryption can be performed with each private key is restricted to a prescribed upper limit number.

8. The non-transitory computer readable recording medium storing the image processing program according to claim 7, wherein the outputting of the encrypted image data further comprises outputting a public key.

9. The non-transitory computer readable recording medium storing the image processing program according to claim 7, wherein the image processing program further causes the processor of the imaging module to execute:

generating a public key with which a constant to be used in an inference process is to be encrypted, wherein the outputting of the encrypted image data further comprises outputting the encrypted image data and the public key to an inference device which encrypts, with the public key, the constant to be used in the inference process and performs, with the encrypted image data that is not decrypted, the inference process, and the receiving comprises receiving the encrypted result signal that is inferred in the inference device with the encrypted image data.

10. An imaging module comprising:

a control circuit configured to
    convert an input optical image into image data,
    encrypt the image data by a homomorphic encryption method; and an interface configured to
    output the encrypted image data, and
    receive a result signal that is encrypted by the homomorphic encryption method and is a result of processing performed on the encrypted image data, wherein the control circuit is further configured to decrypt the result signal, wherein the interface is further configured to output the decrypted result signal, and wherein a data amount of the result signal that can be decrypted by the control circuit in a prescribed time is smaller than a data amount of the image data that can be encrypted by the control circuit in the prescribed time.

11. The imaging module according to claim 10, wherein the interface is further configured to output the encrypted image data and a public key.

12. The imaging module according to claim 10, wherein the control circuit is further configured to generate a public key with which a constant to be used in an inference process is to be encrypted, and the interface is further configured to
    output the encrypted image data and the public key to an inference device which encrypts, with the public key, the constant to be used in the inference process and performs, with the encrypted image data that is not decrypted, the inference process, and
    receive the encrypted result signal that is inferred in the inference device with the encrypted image data.

13. An imaging module comprising:

a control circuit configured to
    convert an input optical image into image data,
    encrypt the image data by a homomorphic encryption method, and
    add a time stamp to the encrypted image data; and an interface configured to
    output the encrypted image data, and
    receive an input signal, wherein the control circuit is further configured to refer to a time stamp added to the input signal, when a time longer than or equal to a prescribed threshold time has not elapsed from a time indicated by the time stamp, the control circuit is further configured to decrypt the input signal, which is a result signal that is encrypted by the homomorphic encryption method and is a result of processing performed on the encrypted image data, and the interface is further configured to output the decrypted result signal, and when a time longer than or equal to the prescribed threshold time has elapsed from the time indicated by the time stamp, the control circuit is further configured to abstain from decrypting the input signal.

14. The imaging module according to claim 13, wherein the interface is further configured to output the encrypted image data and a public key.

15. The imaging module according to claim 13, wherein the control circuit is further configured to generate a public key with which a constant to be used in an inference process is to be encrypted, and the interface is further configured to
    output the encrypted image data and the public key to an inference device which encrypts, with the public key, the constant to be used in the inference process and performs, with the encrypted image data that is not decrypted, the inference process, and
    receive the encrypted result signal that is inferred in the inference device with the encrypted image data.

16. An imaging module comprising:

a control circuit configured to
    convert an input optical image into image data,
    generate a public key and a private key every image frame, and
    encrypt the image data by a homomorphic encryption method such that pixel values of each image frame are encrypted with a public key that is dedicated to the image frame; and an interface configured to
    output the encrypted image data, and
    receive a result signal that is encrypted by the homomorphic encryption method and is a result of processing performed on the encrypted image data, wherein the control circuit is further configured to decrypt the result signal with the private key such that a number of times decryption can be performed with each private key is restricted to a prescribed upper limit number, and wherein the interface is further configured to output the decrypted result signal.

17. The imaging module according to claim 16, wherein the interface is further configured to output the encrypted image data and a public key.

18. The imaging module according to claim 16, wherein the control circuit is further configured to generate a public key with which a constant to be used in an inference process is to be encrypted, and the interface is further configured to
    output the encrypted image data and the public key to an inference device which encrypts, with the public key, the constant to be used in the inference process and performs, with the encrypted image data that is not decrypted, the inference process, and receive the encrypted result signal that is inferred in the inference device with the encrypted image data.

\* \* \* \* \*